United States Patent
Chakravarty et al.

(10) Patent No.: US 10,310,707 B2
(45) Date of Patent: Jun. 4, 2019

(54) REMOTE-DEVICE-MANAGEMENT USER INTERFACE ENABLING AUTOMATIC CARRYOVER OF SELECTED MAINTENANCE-PROCESS GROUPS IN TRANSITIONING AMONG HIERACHIZED DEVICE GROUPS

(71) Applicant: Kyocera Document Solutions Inc., Osaka (JP)

(72) Inventors: Mrinalini Chakravarty, Lafayette, CA (US); Dai Shigenobu, Walnut Creek, CA (US)

(73) Assignee: Kyocera Document Solutions Inc., Osaka (JP)

( * ) Notice: Subject to any disclaimer, the term of this patent is extended or adjusted under 35 U.S.C. 154(b) by 343 days.

(21) Appl. No.: 15/169,683

(22) Filed: May 31, 2016

(65) Prior Publication Data
US 2017/0344196 A1    Nov. 30, 2017

(51) Int. Cl.
| | |
|---|---|
| G06F 3/0482 | (2013.01) |
| G06F 3/0485 | (2013.01) |
| G03G 15/00 | (2006.01) |
| G06F 3/14 | (2006.01) |
| G09G 5/12 | (2006.01) |

(52) U.S. Cl.
CPC ....... *G06F 3/0482* (2013.01); *G03G 15/5075* (2013.01); *G03G 15/5079* (2013.01); *G06F 3/0485* (2013.01); *G06F 3/1431* (2013.01); *G09G 5/12* (2013.01); *G09G 2370/02* (2013.01)

(58) Field of Classification Search
CPC .... G06F 3/0482; G06F 3/0485; G06F 3/1431; G09G 5/12; G09G 2370/02; G03G 15/5079
See application file for complete search history.

(56) References Cited

U.S. PATENT DOCUMENTS

| | | | |
|---|---|---|---|
| 7,418,670 B2 | 8/2008 | Goldsmith | |
| 8,812,955 B2 | 8/2014 | Narioka et al. | |
| 9,152,113 B2 | 10/2015 | Suzuki | |
| 2008/0059913 A1* | 3/2008 | Burtner | G06F 3/0482 715/854 |
| 2008/0222565 A1* | 9/2008 | Taylor | G05B 15/02 715/810 |
| 2010/0275151 A1* | 10/2010 | Arakane | H04N 1/0035 715/784 |
| 2013/0198677 A1* | 8/2013 | Dash | G06F 3/0488 715/776 |

(Continued)

*Primary Examiner* — Rinna Yi
(74) *Attorney, Agent, or Firm* — HEA Law PLLC

(57) ABSTRACT

Method of providing a user interface in a display device for remote management of grouped plurality of devices. The method includes: receiving a first selection for selecting one group of a plurality of groups of devices; receiving a second selection for selecting one item of a plurality of items related to each of the plurality of groups; displaying a management screen for the selected item related to the selected group in response to a selection of the group while keeping the item selected before the selection of the group, the management screen being used for management of the selected item related to the selected group; and displaying the management screen for the selected item related to the selected group in response to a selection of the item while keeping the group selected before the selection of the item.

15 Claims, 10 Drawing Sheets

(56) References Cited

U.S. PATENT DOCUMENTS

2014/0173516 A1 6/2014 Hwang et al.
2015/0254035 A1* 9/2015 Derouchie ............ G06F 3/1225
358/1.15

* cited by examiner

Second Embodiment

Modification

REMOTE-DEVICE-MANAGEMENT USER INTERFACE ENABLING AUTOMATIC CARRYOVER OF SELECTED MAINTENANCE-PROCESS GROUPS IN TRANSITIONING AMONG HIERACHIZED DEVICE GROUPS

BACKGROUND

Unless otherwise indicated herein, the description in this section is not prior art to the claims in this application and is not admitted to be prior art by inclusion in this section.

As an image forming apparatus (for example, a printer, a multifunction printer, or a multi-functional peripheral) becomes complex and sophisticated, contents of its maintenance have been also become complex. In association with this, it has been spreading that an operation by vendors and service providers of image forming apparatuses maintain a multiple image forming apparatuses from remote places. Remote management allows the vendors or similar operators to consistently make a diagnosis, troubleshoot, update firmware, setting, and even supply toners and other spare parts, as part of maintenance related to an image forming apparatus.

In such conditions, it is expected that an improvement in work efficiency by maintenance administrators performing the remote management.

SUMMARY

A method according to one aspect of the disclosure is to provide a user interface in a display device for remote management of grouped plurality of devices. The method includes: receiving a first selection for selecting one group of a plurality of groups of devices; receiving a second selection for selecting one item of a plurality of items related to each of the plurality of groups; displaying a management screen for the selected item related to the selected group in response to a selection of the group while keeping the item selected before the selection of the group, the management screen being used for management of the selected item related to the selected group; and displaying the management screen for the selected item related to the selected group in response to a selection of the item while keeping the group selected before the selection of the item.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
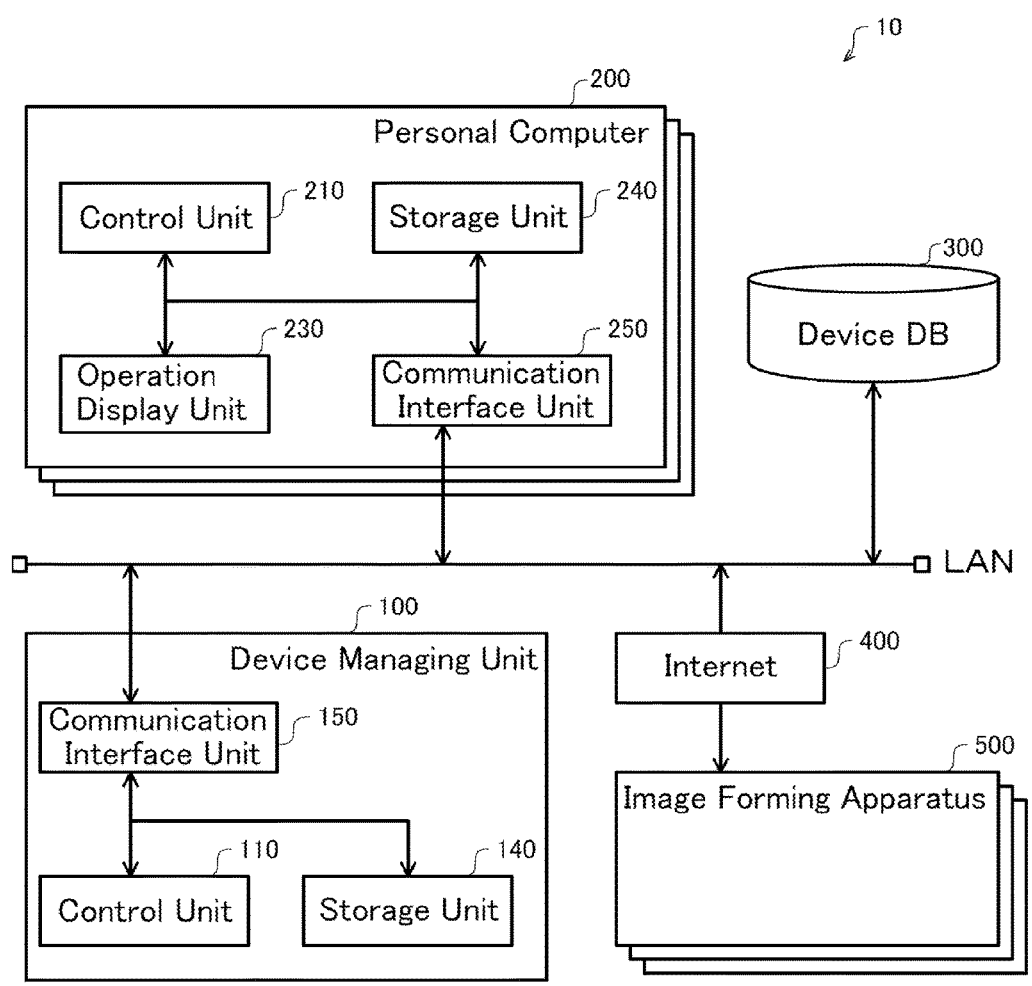
FIG. 1 is a block diagram illustrating a functional configuration of a remote management system 10 according to respective embodiments of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

A. First Embodiment

The following describes respective embodiments of the disclosure (hereinafter referred to as the "embodiments") with reference to the drawings.

FIG. 1 is a block diagram illustrating a functional configuration of a remote management system 10 according to one embodiment of the disclosure. The remote management system 10 includes a device managing unit 100, a plurality of personal computers 200, a device database 300, and a plurality of image forming apparatuses 500. The plurality of personal computers 200 are connected to the device managing unit 100 and the device database 300 on the network (LAN in this example). The plurality of the image forming apparatuses 500 are connected to the network via an Internet 400. The remote management system 10 is configurable even if there is one personal computer 200.

The device managing unit 100 includes a control unit 110, a storage unit 140 and a communication interface unit 150. The personal computer 200 includes a control unit 210, an operation display unit 230, a storage unit 240, and a communication interface unit 250. The device database 300 stores device information that represents setting contents and states of the plurality of the image forming apparatuses 500. The plurality of the image forming apparatuses 500 are connected to the network via the Internet 400 using a protocol with high secrecy such as HyperText Transfer Protocol Secure (HTTPS).

The communication interface unit 150 and the communication interface unit 250 communicate using TCP/IP (Transmission Control Protocol/Internet Protocol) protocols.

The operation display unit 230 of the personal computer 200 functions as a touch panel in this embodiment to display various menus as entry screens. The operation display unit 230 further provides user interfaces such as a computer mouse and a keyboard in this embodiment to receive operation inputs by a user. The operation display unit 230 uses a web browser to achieve a web-based display.

The control units 110, 210 include a main storage unit such as a RAM and a ROM, and a control unit such as a micro-processing unit (MPU) and a central processing unit (CPU). The control units 110, 210 also include a controller function related to interfaces such as various kinds of I/O, a universal serial bus (USB), a bus and other hardware, and respectively control the whole device managing unit 100 and the whole personal computer 200.

The storage units 140, 240 are storage devices composed of such as a hard disk drive and a flash memory, which are non-temporal recording media, and respectively store control programs and data of processes that the control units 110, 210 execute.

Figure 2:
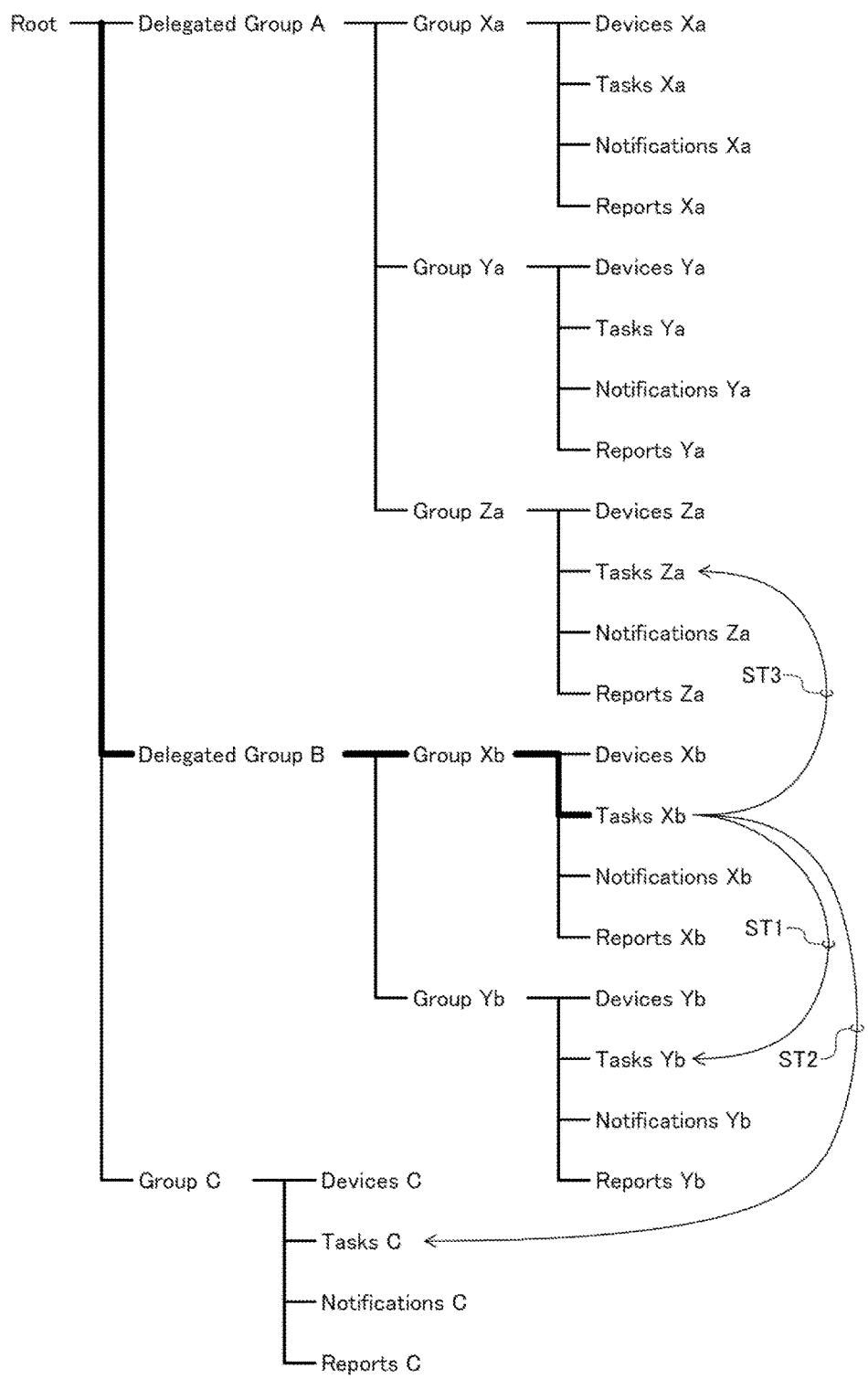
FIG. 2 is a hierarchical chart illustrating a hierarchy of maintenance target devices of the remote management system 10 according to the respective embodiments.

FIG. 2 is a hierarchical chart illustrating a hierarchy of maintenance target devices of the remote management system 10 according to the respective embodiments. In this embodiment, the remote management system 10 performs maintenance management by grouping the plurality of the image forming apparatuses 500. The plurality of the image forming apparatuses 500 are registered in the device managing unit 100 per a group, and are connected to the device managing unit 100 via the Internet 400. A group is the smallest unit of the maintenance management of the plurality of the image forming apparatuses 500.

In this embodiment, the plurality of the image forming apparatuses 500 are registered in groups having a plurality of hierarchies. Specifically, the plurality of the image forming apparatuses 500 are grouped into an upper group (also referred to as a delegated group) A, an upper group B and a group C in the first hierarchy. The upper group A is grouped into a group Xa, a group Ya, and a group Za. The upper group B is grouped into a group Xb and a group Yb.

The group Xa, the group Ya, the group Za, the group Xb, the group Yb, and the group C are the smallest units of the maintenance management of the plurality of the image forming apparatuses 500. The maintenance management is performed per a target item in each group. In this embodiment, the target items include devices, tasks, notifications and reports.

The maintenance management performs setting and management of each device, setting and management of each task, setting and management of each notification, and setting and management of each report. Information used for these setting and management is automatically collected by the device managing unit 100 from the plurality of the image forming apparatuses 500 to be hierarchized and stored in the device database 300 as described above.

Figure 3:
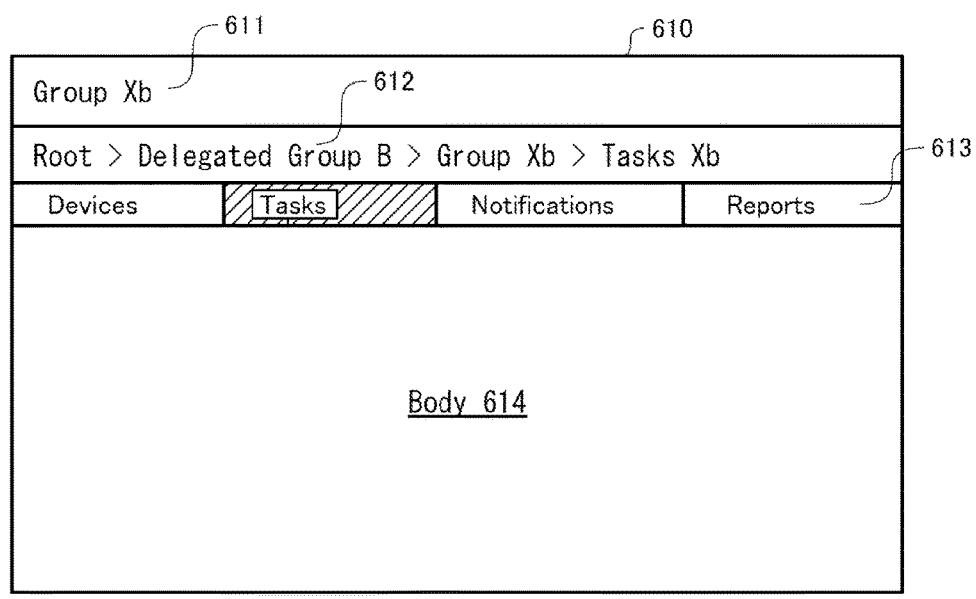
FIG. 3 illustrates an exemplary management screen of the remote management system 10 according to a first embodiment.

FIG. 3 illustrates an exemplary management screen 610 of the remote management system 10 according to a first embodiment. The management screen 610 is displayed on the operation display unit 230 of the personal computer 200. The operation display unit 230 uses a web browser for displaying. The web browser is software to display a Webpage prepared in HTML on the World Wide Web (WWW). Typical examples of web browsers include Internet Explorer™, Netscape™, Google Chrome™, Mozilla Firefox™ and Opera™.

The management screen 610 includes a header area 611, a hierarchical position display area 612, a target item display area 613, and a maintenance information display area 614. The header area 611 displays a group to be managed (the group Xb in this example). The hierarchical position display area 612 displays breadcrumbs indicating a position in the hierarchy of the group to be managed. The target item display area 613 displays target items (devices, tasks, notifications, and reports in this example) to be set and managed. The maintenance information display area 614 displays setting contents and management conditions. The management screen 610 is displayed based on Web data received from the device managing unit 100. The target item display area 613 is also referred to as a second menu.

A person in charge of the maintenance management may change a display content of the maintenance information display area 614 by using the hierarchical position display area 612 and the target item display area 613. The header area 611 displays a group that is selected (the group Xb in this example). In the target item display area 613, an area displaying a text of "tasks" is highlighted. Thus, in the example in FIG. 3, "tasks" is selected as the target item, and the maintenance information display area 614 displays information for setting and management that target tasks of the group Xb. When changing the target item, the group selection is kept. That is, even if the target item is changed, as for the group, the group before changing the target item is still selected.

Figure 4:
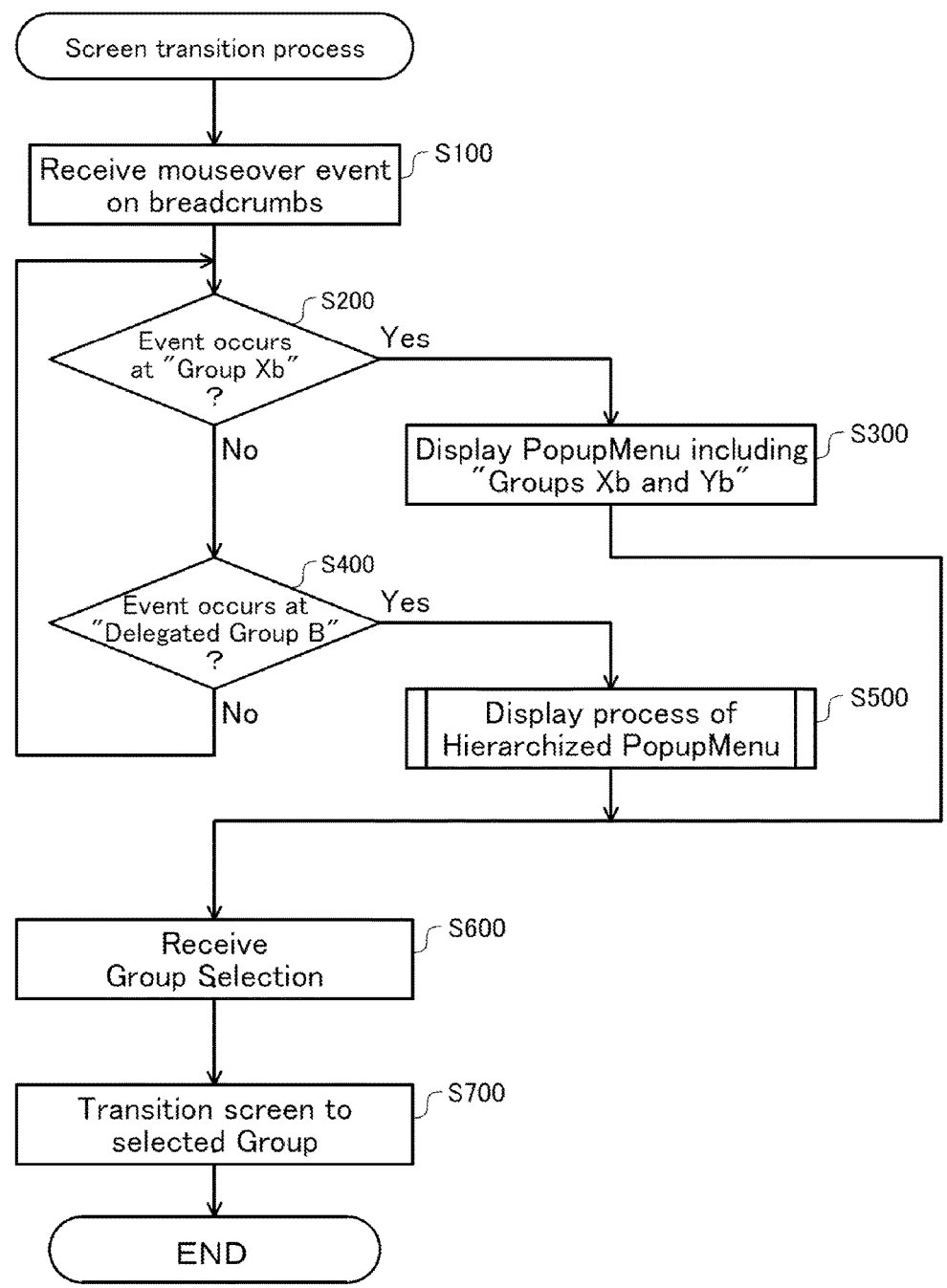
FIG. 4 is a flowchart illustrating a transition method of the management screen according to the first embodiment.

FIG. 4 is a flowchart illustrating a transition method of the management screen according to the first embodiment. In this example, assume that the management screen 610 is transitioned by a user using a computer mouse (not illustrated).

At step S100, the operation display unit 230 receives a mouse-over event in the hierarchical position display area 612 where the breadcrumbs are displayed. The mouse-over event is an event that occurs when a cursor enters within the hierarchical position display area 612 by the person in charge of the maintenance management operating a computer mouse.

The personal computer 200 transmits predetermined information to the device managing unit 100 using the communication interface unit 250 in response to the reception of the mouse-over event. The predetermined information includes information indicating whether or not the mouse-over event has occurred in any area where a text of "group Xb" or a text of "upper group B" is displayed in the breadcrumbs.

At step S200, when the device managing unit 100 determines that the mouse-over event has occurred in the area where the text of "group Xb" is displayed in the hierarchical position display area 612, the device managing unit 100 proceeds the process to step S300. When the device managing unit 100 determines that the mouse-over event has occurred in the area except for where the text of "group Xb" is displayed, the device managing unit 100 proceeds the process to step S400.

Figure 5A:
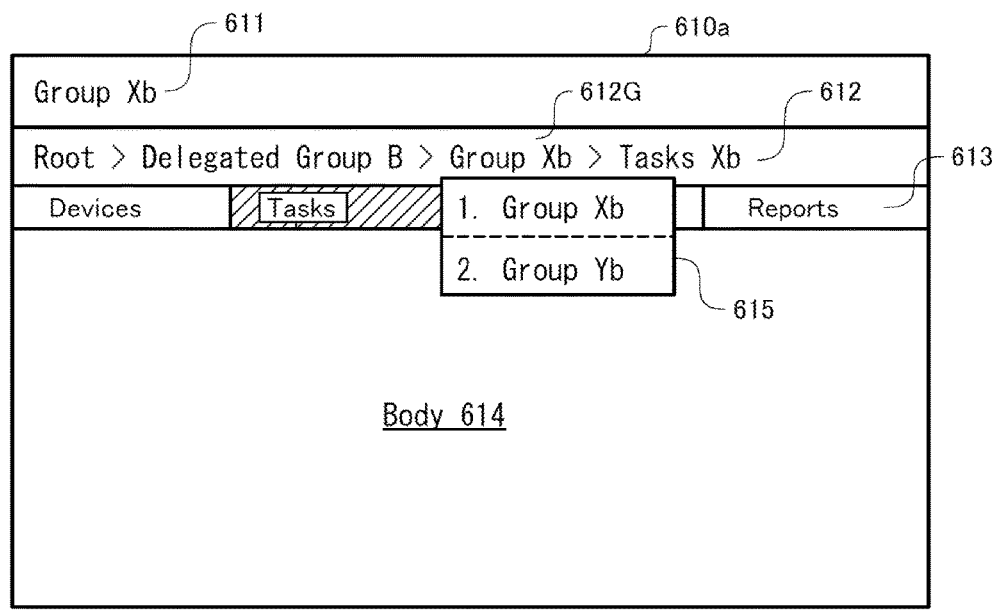
FIGS. 5A and 5B illustrate a first screen transition of the management screen according to the first embodiment.
Figure 5B:
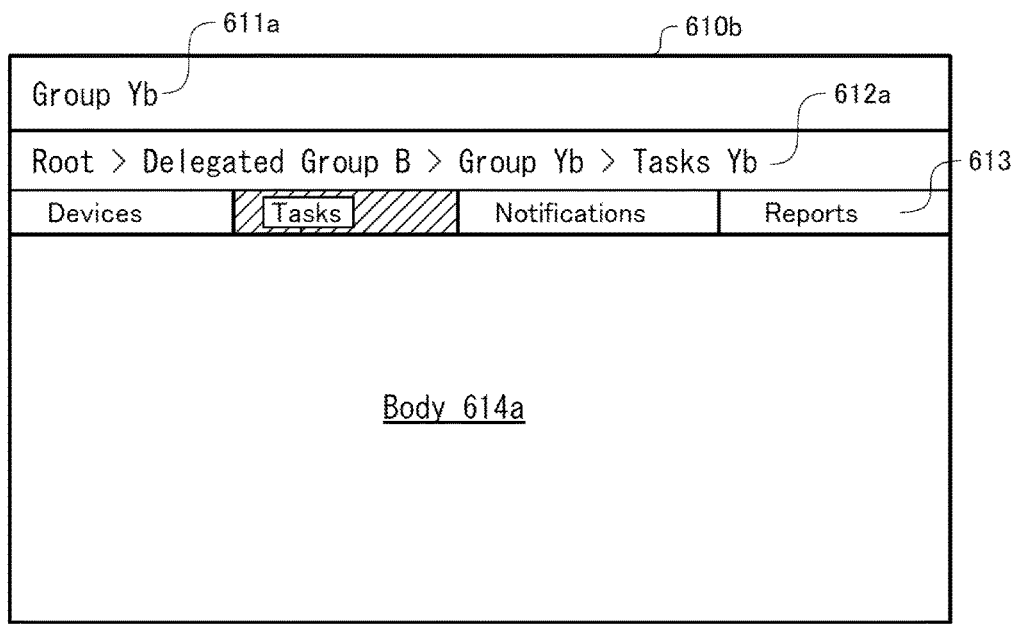

FIGS. 5A and 5B are explanatory views illustrating a first screen transition of the management screen according to the first embodiment. FIG. 5A is an explanatory view illustrating a management screen 610a before the first screen transition. The management screen 610a displays information for setting and management that target the tasks of the group Xb in the maintenance information display area 614. FIG. 5B is an explanatory view illustrating a management screen 610b after the first screen transition to Group Yb, as indicated in the header area 611a. The management screen 610b displays information for setting and management that target tasks of the group Yb (indicated by reference mark 612a) in the maintenance information display area 614a.

At step S300, the device managing unit 100 displays a pop-up menu 615 on the operation display unit 230 of the personal computer 200 as illustrated in FIG. 5A. The pop-up menu 615 is displayed below the area where the text "Group Xb" (indicated by reference mark 612G) is displayed in the breadcrumbs. The pop-up menu 615 enables to select any of the group Xb or the group Yb. The pop-up menu 615 is displayed based on Web data received from the device managing unit 100. The pop-up menu 615 is also referred to as a first menu.

Assume that the person in charge of the maintenance management operates the computer mouse to move the cursor over the group Yb in the pop-up menu 615, and clicks in the area where a text of "group Yb" is displayed.

At step S600, assume that the operation display unit 230 receives a click event in the area where the text of "group Yb" is displayed in the pop-up menu 615. The personal computer 200 transmits a predetermined signal to the device managing unit 100 in response to the occurrence of the click event in the area where the text of "group Yb" is displayed.

At step S700, the device managing unit 100 transmits the Web data to the personal computer 200 in response to the reception of the predetermined signal, so as to transition the screen display of the operation display unit 230 to the management screen 610b. This causes the operation display unit 230 to transition from a display of setting and management that target the tasks of the group Xb to a display of setting and management that target the tasks of the group Yb. Thus, the task is kept as the target item, when transitioning from the group Xb to the group Yb.

At step S400, when the device managing unit 100 determines that the mouse-over event has occurred in the area where the text of "upper group B" is displayed in the hierarchical position display area 612, the device managing unit 100 proceeds the process to step S500. When the device managing unit 100 determines that the mouse-over event has occurred in the area except for where the text of group Xb is displayed, the device managing unit 100 returns the process to step S200.

Figure 6:
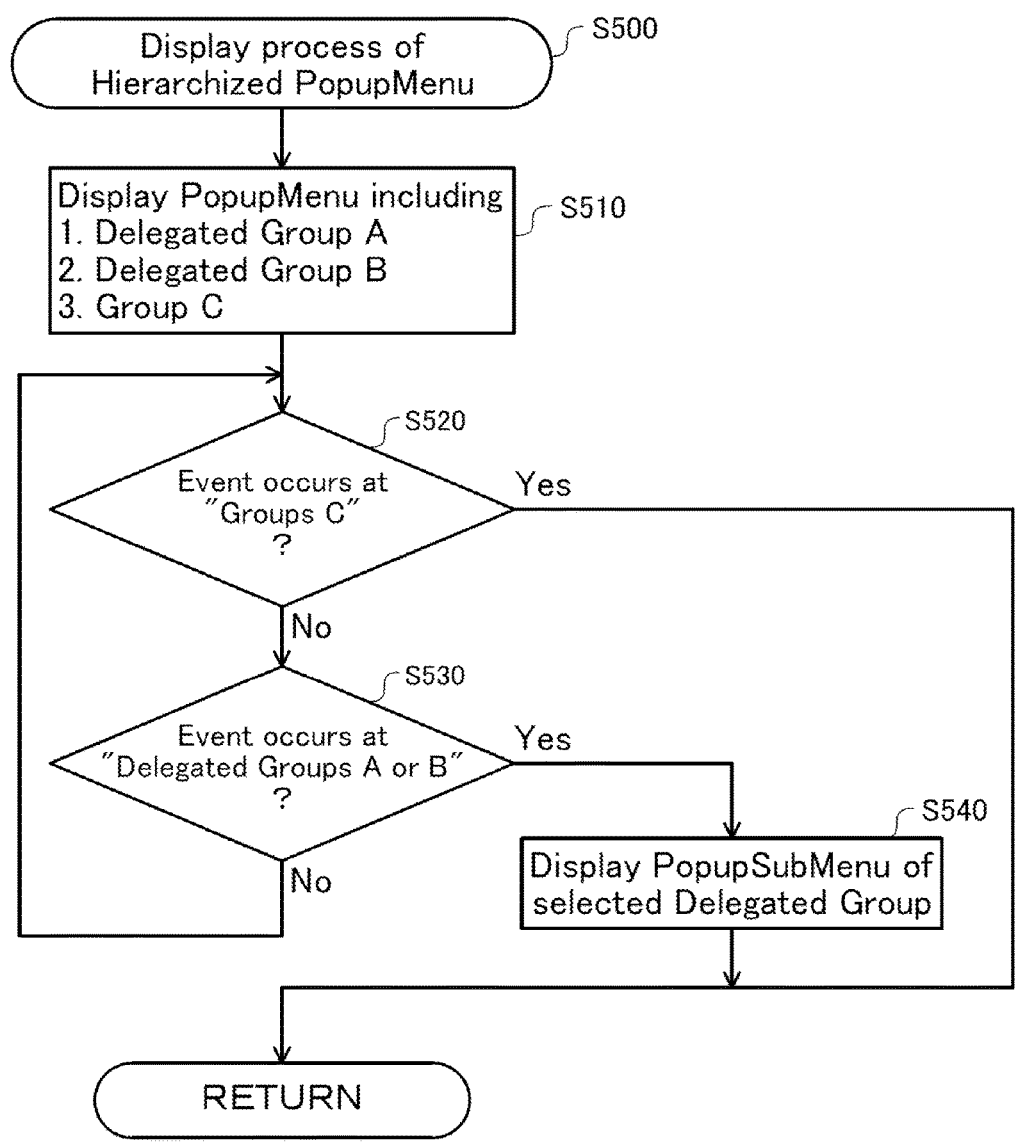
FIG. 6 is a flowchart illustrating a display process method of a hierarchic menu on the management screen according to the first embodiment.
Figure 7A:
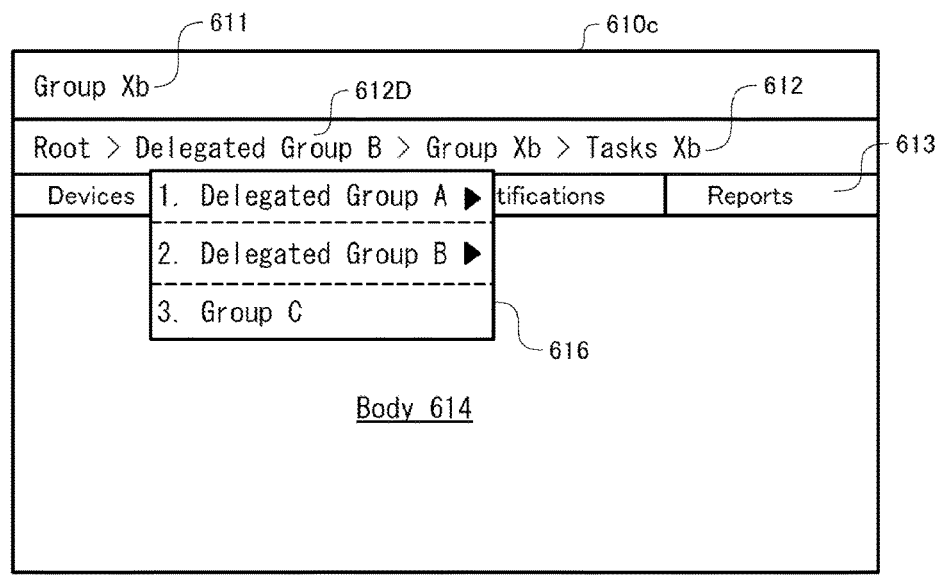
FIGS. 7A and 7B illustrate a second screen transition of the management screen according to the first embodiment.
Figure 7B:
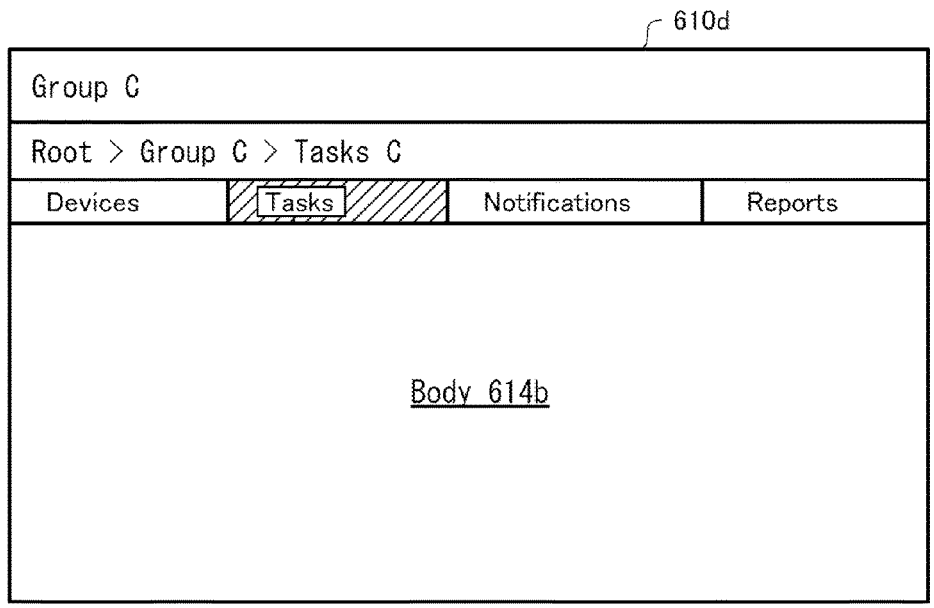

FIG. 6 is a flowchart illustrating a display process method (step S500) of a hierarchic menu on a user interface screen according to the first embodiment. FIGS. 7A and 7B illustrate a second screen transition of the user interface screen according to the first embodiment. FIG. 7A is an explanatory view illustrating a management screen 610c before the second screen transition. The management screen 610c displays information for setting and management that target the group Xb in the maintenance information display area 614. FIG. 7B is an explanatory view illustrating a management screen 610d after the second screen transition. The management screen 610d displays information for setting and management that target tasks of the group C in the maintenance information display area 614b.

At step S510, the device managing unit 100 displays a pop-up menu 616 on the operation display unit 230 of the personal computer 200 as illustrated in FIG. 7A. The pop-up menu 616 is displayed below the area where the text of "Delegated Group B" vindicated by reference mark 612D) is displayed in the breadcrumbs. The pop-up menu 616 enables to select any of the upper group A, the upper group B, or the group C. The pop-up menu 616 is displayed based on Web data received from the device managing unit 100.

At step S520, assume that the person in charge of the maintenance management operates the computer mouse to move the cursor over the group C in the pop-up menu 616, and clicks in the area where a text of "group C" is displayed.

At step S600 (see FIG. 4), the operation display unit 230 receives a click event in the area where the text of "group C" is displayed in the pop-up menu 616. The personal computer 200 transmits a predetermined signal to the device managing unit 100 in response to the occurrence of the click event in the area where the text of "group C" is displayed.

At step S700, the device managing unit 100 transmits the Web data to the personal computer 200 in response to the reception of the predetermined signal, so as to transition the screen display of the operation display unit 230 to the management screen 610b. This causes the operation display unit 230 to transition from a display for setting and management that target the tasks of the group Xb to a display for setting and management that target the tasks of the group C. Thus, the task is kept as the target item, when transitioning from the group Xb to the group C.

Figure 8A:
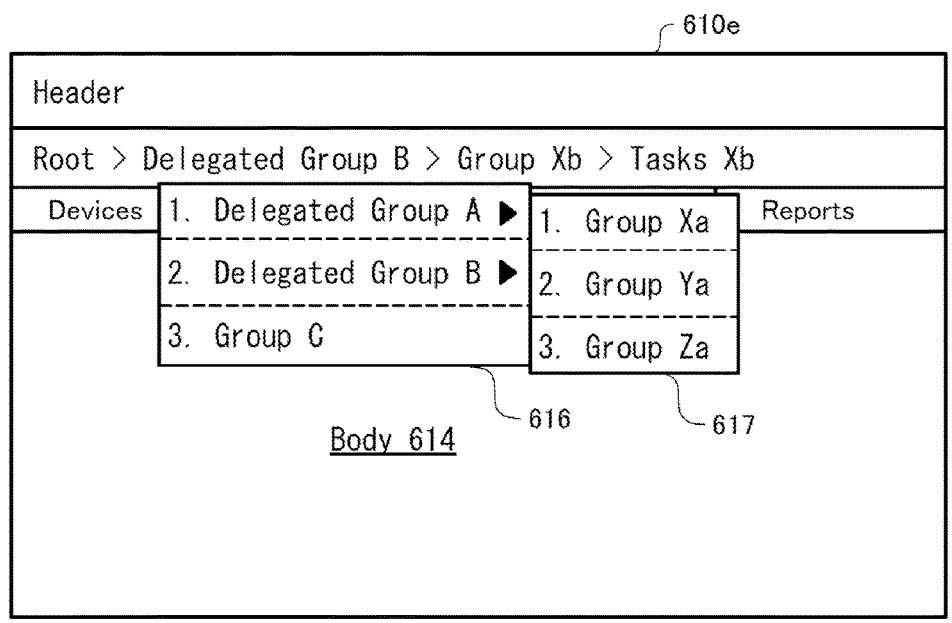
FIGS. 8A and 8B illustrate a third screen transition of the management screen according to the first embodiment.
Figure 8B:
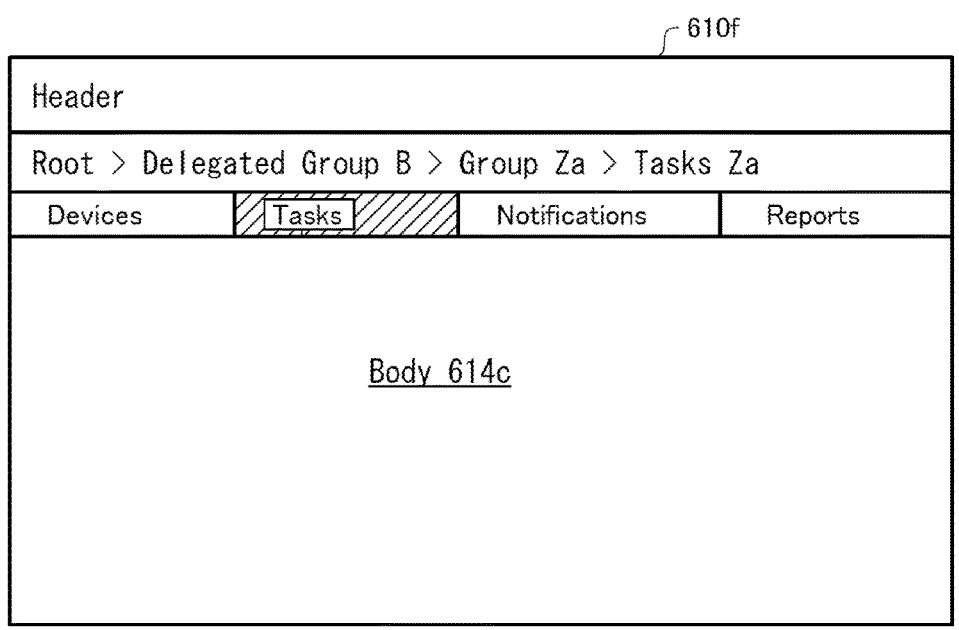

FIGS. 8A and 8B illustrate a third screen transition of the user interface screen according to the first embodiment. The third screen transition is a transition of the upper (Delegated) Group A or the upper (Delegated) Group B, as indicated in FIG. 8A, illustrating a management screen 610e before the third screen transition, to a screen of a sub group, as indicated in FIG. 8B, illustrating a management screen 610f after the third screen transition.

At step S530, assume that the person in charge of the maintenance management operates the computer mouse to move the cursor over the area where a text of "upper group A" or "upper group B" is displayed in the pop-up menu 616. The operation display unit 230 receives a mouse-over event in the area where the text of "upper group A" or "upper group B" is displayed in the pop-up menu 616.

The personal computer 200 transmits a predetermined signal to the device managing unit 100 in response to the occurrence of the mouse-over event in the area where the text of "upper group A" or "upper group B" is displayed. The personal computer 200 proceeds the process to step S540.

At step S540, the device managing unit 100 displays a pop-up sub-menu 617 on the operation display unit 230 of the personal computer 200 as illustrated in FIG. 8A. The pop-up sub-menu 617 is displayed on the right side of the pop-up menu 616 in response to the mouse-over event in the pop-up menu 616.

The content of the pop-up sub-menu 617 varies corresponding to the position of the cursor. When the cursor is in the area where the text of "upper group A" is displayed, the content of the pop-up sub-menu 617 enables to select the group Xa, the group Ya, and the group Za, which are the sub groups (also referred to as lower groups) of the upper group A. On the other hand, when the cursor is in the area where the text of "upper group B," the content of the pop-up sub-menu 617 enables to select the group Xb, the group Yb, and the group Zb, which are the sub groups (also referred to as lower groups) of the upper group B.

Assume that the person in charge of the maintenance management operates the computer mouse to move the cursor over the group Za in the pop-up sub-menu 617, and clicks in the area where a text of "group Za" is displayed.

At step S600, the operation display unit 230 receives a click event in the area where the text of "group Za" in the pop-up sub-menu 617 is displayed. The personal computer 200 transmits a predetermined signal to the device managing unit 100 in response to the occurrence of the click event in the area where the text of "group Za" is displayed.

At step S700, the device managing unit 100 transmits the Web data to the personal computer 200 in response to the reception of the predetermined signal, so as to transition the screen display of the operation display unit 230 to the management screen 610f illustrated in FIG. 8B. This causes the operation display unit 230 to transition from a display of setting and management that target the tasks of the group Xb, as indicated on the management screen 610e illustrated in FIG. 8A, to a display for setting and management that target tasks of the group Za in the maintenance information display area 614c of the management screen 610f illustrated in FIG. 8B. Thus, the task is kept as the target item, when transitioning from the group Xb to the group Za.

Thus, the remote management system 10 according to the first embodiment is configured to change the groups and the target items easily on the management screen constituted based on: the groups, which are the smallest units of the maintenance management of the plurality of the image forming apparatuses 500, and the target items (devices, tasks, notifications and reports in this example), which are targeted by the maintenance management setting and management. This ensures the improved work efficiency of the maintenance administrators who perform the remote management.

In the above-described embodiment, the display changes by receiving Web data from the device managing unit 100 in response to a mouse-over event and a click event. However, it is not necessarily limited to such a method, for example, Web data for a pop-up menu and a display screen at a transition destination may be received and drawn in advance. This ensures the instantaneous display of a Popup screen and to transition a screen.

B. Second Embodiment

Figure 9:
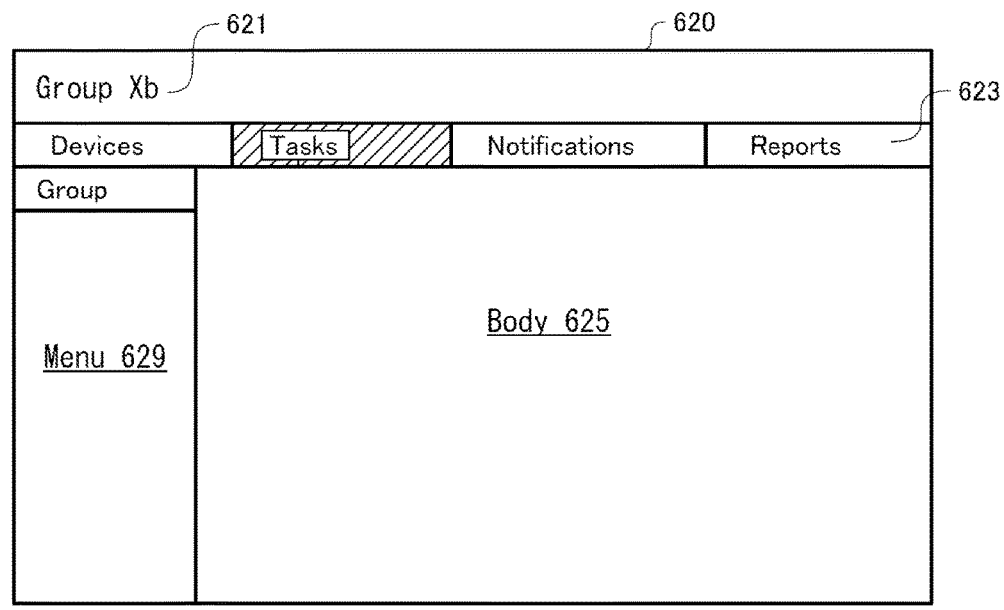
FIG. 9 illustrates an exemplary management screen of the remote management system 10 according to a second embodiment.

FIG. 9 illustrates an exemplary management screen 620 of the remote management system 10 according to a second embodiment. The management screen 620 differs from the management screen 610 in that the hierarchical position display area 612, which displays the breadcrumbs indicating the position of the group to be managed in the hierarchy, is deleted. The management screen 620 nevertheless includes a header area 621, a target item display area 623, and a maintenance information display area 625.

The management screen 620 includes a group selecting menu 629 for selecting a group, instead of the hierarchical position display area 612. The group selecting menu 629 may be configured to enable a hierarchized selection achieved by the pop-up menu 616 and the pop-up sub-menu 617 as necessary.

C. Modifications

Figure 10:
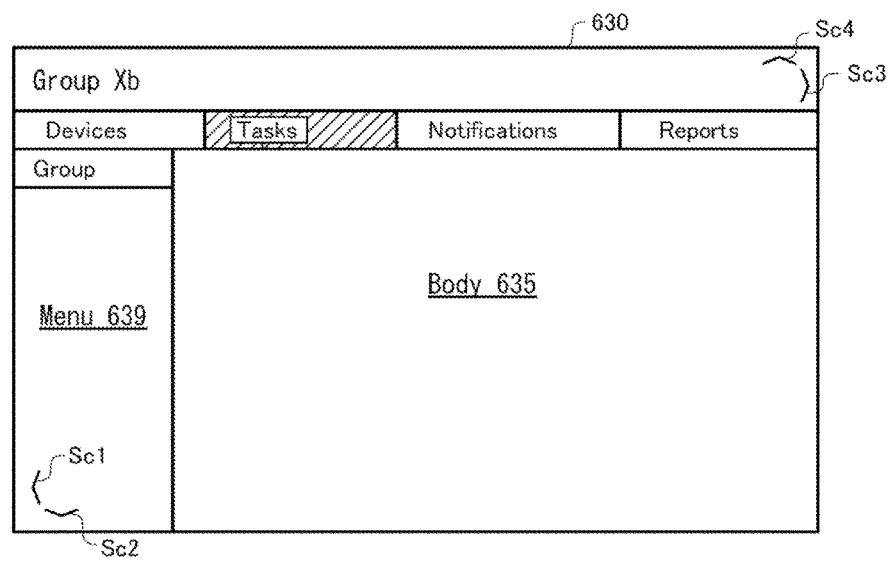
FIG. 10 illustrates an exemplary management screen according to a modification.

The disclosure will not be limited to the respective embodiments described above, but modifications as follows are also possible.
Modification 1:
While the above-described embodiment uses a mouse event for a user input, a touch event on a touch panel may be employed.
Modification 2:
The above-described embodiment selects a group using an event in the hierarchical position display area (alternatively, the group selecting menu 629), and then selects a target item using an event in the target item display area, however, such a configuration should not be construed in a limiting sense. Specifically, the management screen may be configured to transition the management screen by scrolling the management screen using scroll icons Sc1 to Sc4 as illustrated in FIG. 10, for example. It will be appreciated that as a modification of the second embodiment illustrated in FIG. 9, the management screen 630 illustrated in FIG. 10 analogously includes a maintenance information display area 635, and group selecting menu 639.

Figure 11:
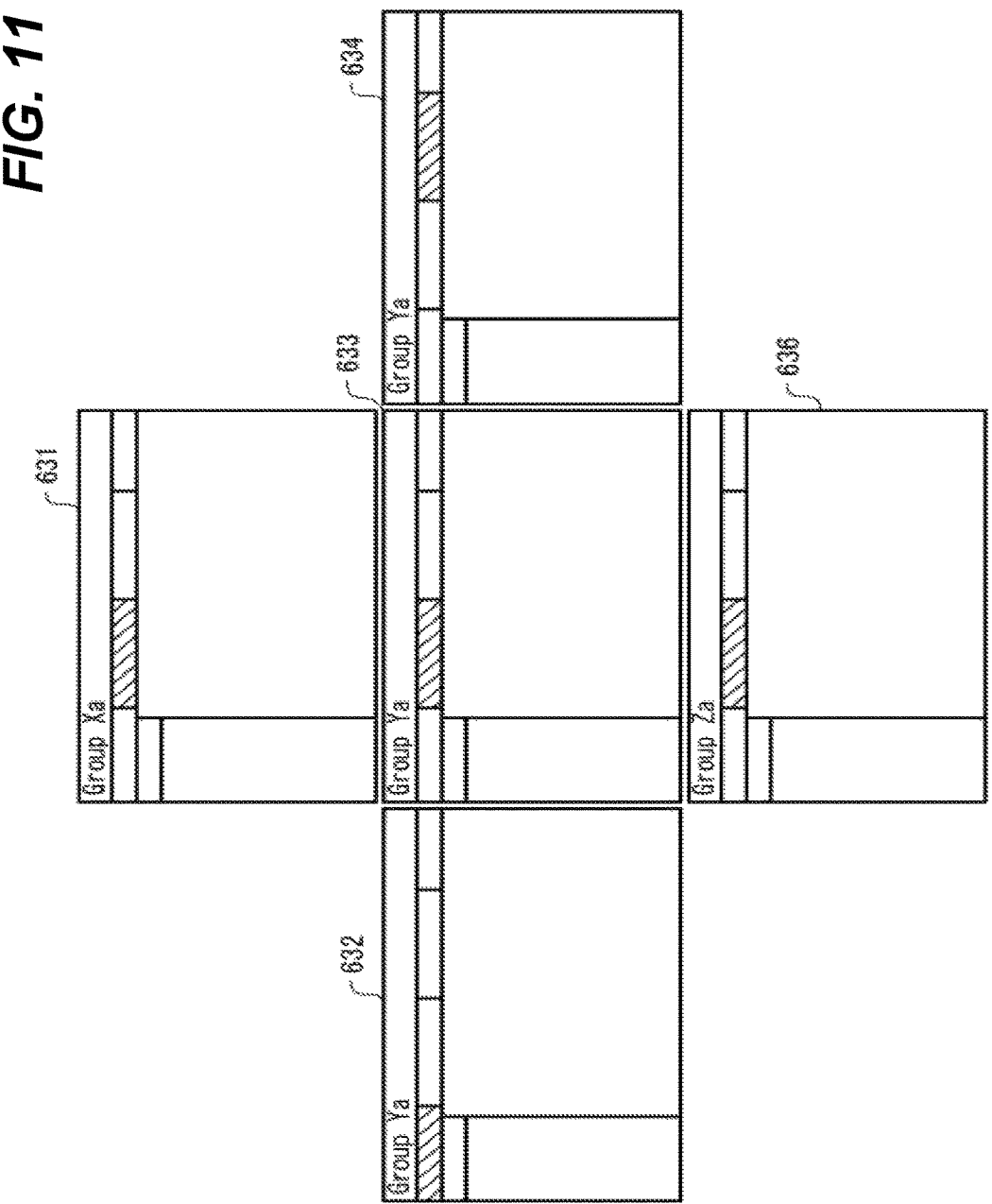
FIG. 11 illustrates an exemplary transition of the management screen according to a modification.

The screen transition by scrolling, for example, as illustrated in FIG. 11, a management screen 633 (group Ya, tasks) transitions to a management screen 632 (group Ya, devices) by clicking the scroll icon Sc1 to scroll to the left side. Clicking the scroll icon Sc2 scrolls the management screen 633 (group Ya, tasks) to the lower side to transition to a management screen 636 (group Za, devices). Clicking the scroll icon Sc3 scrolls the management screen 633 (group Ya, tasks) to the right side to transition to a management screen 634 (group Ya, notifications). Clicking the scroll icon Sc4 scrolls the management screen 633 (group Ya, tasks) to the upper side to transition to a management screen 631 (group Xa, tasks).

Thus, this modification, while changing the target items sequentially by scrolling laterally, also changes the groups sequentially by scrolling vertically. Furthermore, the management screen may be configured to change the target items and the groups simultaneously with a scroll icon of the oblique direction. Scrolling may be configured to be achieved by sliding a finger on a touch panel. It is preferable that a screen of a scroll destination be drawn in advance and stored in a memory of the personal computer 200.
Modification 3:
The above-described embodiment uses a personal computer, however, the disclosure is also applicable to portable terminals such as laptop PCs and tablets as long as they can communicate with image forming apparatuses. The communication includes a wired communication and a wireless communication. Furthermore, a device to be managed is not necessarily an image forming apparatus, any device (electronic device) that can connect to the network widely is possible. However, since the image forming apparatus uses lots of movable parts and consumable materials and has lots of items of setting and adjustment, the above-described hierarchized management significantly ensures the reduced management workload.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In a network-linked system for remote management of electromechanical device maintenance, the system being made up of a personal computer having an operation display unit, of a device managing unit having a storage unit, of a device database, and of a plurality of electromechanical devices, a method of transitioning among hierarchized electromechanical-device groups in a user interface presented on the personal computer's operation display unit using a web browser for displaying a management screen, the method comprising:

registering the plurality of electromechanical devices as maintenance-management device groups in the device management unit's storage unit, and hierarchizing the device groups as device upper groups and device lower groups, the device lower groups being the smallest units of maintenance management of the plurality of electromechanical devices, and a portion of the device lower groups being corresponding subunits of the device upper groups;

in the device management unit automatically, collecting device settings and management information from each of the electromechanical devices, and storing in the device database the device settings and management information;

displaying, in the management screen, a header area displaying a group to be managed, a hierarchical position display area displaying breadcrumbs indicating a position in the hierarchy of the group to be managed, a maintenance item display area displaying maintenance items, and a maintenance information display area for displaying setting contents and management conditions;

wherein the maintenance items include devices, tasks, notifications, and reports, and wherein the settings and management information include settings and management of each device, settings and management of each task, setting and management of each notification, setting and management of each report;

receiving, in the hierarchical position display area of the user interface, a selection of a particular group and receiving, in the maintenance item display area of the user interface, a selection of a particular maintenance item;

in response to the selections of the particular group and particular maintenance item, displaying, in the maintenance information display area of the user interface, maintenance information for setting management of the selected maintenance item of the selected group;

receiving, in the maintenance item display area of the user interface, a selection of a new maintenance item; and in response to the selection of the newly selected maintenance item, displaying, in the maintenance information display area of the user interface, maintenance information for setting and management of the newly selected maintenance item of the selected group;

wherein the receiving the selection includes changing the plurality of groups according to a scrolling of the management screens in a first direction using one of scroll icons displayed on the management screen, wherein the receiving the maintenance item selection includes changing the items according to a scrolling of the management screens in a second direction intersecting with the first direction using one of scroll icons, wherein the receiving the selection and the receiving the maintenance item selection include changing both the groups and the items according to a scrolling of the management screens in a third direction intersecting with both the first direction and the second direction using the scroll icons.

2. The method according to claim 1, wherein the receiving a transitioning selection includes displaying a pop-up menu for selecting the one group, wherein the transitioning selection is a user selection for transitioning from a prior-selected one of either the device upper groups or the device lower groups to a newly selected one of either the device upper groups or the device lower groups.

3. The method according to claim 2, wherein the receiving the maintenance item selection includes displaying a pop-up submenu for selecting the one device-maintenance item.

4. The method according to claim 2, wherein the pop-up menu is a hierarchized menu including a sub-menu.

5. The method according to claim 2, further comprising:
displaying the breadcrumbs indicating a hierarchy of the plurality of groups; wherein the receiving the transitioning selection includes displaying the first pop-up menu in response to a movement of a cursor over the breadcrumbs.

6. The method according to claim 1, wherein the plurality of electromechanical devices includes a plurality of image forming apparatuses hierarchized into and managed according to respective ones of the device lower groups.

7. In a network-linked system for remote management of electromechanical device maintenance, the system including a device managing unit having a storage unit, a device database, and a plurality of electromechanical devices, the plurality of electromechanical devices being registered as maintenance-management device groups in the device management unit's storage unit, and the device groups being hierarchized as device upper groups and device lower groups, the device lower groups being the smallest units of maintenance management of the plurality of electromechanical devices, and a portion of the device lower groups being corresponding subunits of the device upper groups, and in the device management unit, device settings and management information being automatically collected from each of the electromechanical devices, and the device settings and management information being stored in the device database, a computer having an operation display unit using a web browser for displaying a management screen, and comprising:

at least one processor;
memory; and
program instructions, stored in the memory, that upon execution by the at least one processor cause the computer to perform operations for transitioning among hierarchized electromechanical-device groups in a user interface presented on the personal computer's operation display unit, the operations including:

displaying, in the management screen, a header area displaying a group to be managed, a hierarchical position display area displaying breadcrumbs indicating a position in the hierarchy of the group to be managed, a maintenance item display area displaying maintenance items, and a maintenance information display area for displaying setting contents and management conditions;

wherein the maintenance items include devices, tasks, notifications, and reports, and wherein the settings and management information include settings and management of each device, settings and management of each task, setting and management of each notification, setting and management of each report;

receiving, in the hierarchical position display area of the user interface, a selection of a particular group and receiving, in the maintenance item display area of the user interface, a selection of a particular maintenance item;

in response to the selections of the particular group and particular maintenance item, displaying, in the maintenance information display area of the user interface, maintenance information for setting management of the selected maintenance item of the selected group;

receiving, in the maintenance item display area of the user interface, a selection of a new maintenance item; and in response to the selection of the newly selected maintenance item, displaying, in the maintenance information display area of the user interface, maintenance information for setting and management of the newly selected maintenance item of the selected group;

wherein the receiving the selection includes changing the plurality of groups according to a scrolling of the management screens in a first direction using one of scroll icons displayed on the management screen, wherein the receiving the maintenance item selection includes changing the items according to a scrolling of the management screens in a second direction intersecting with the first direction using one of scroll icons, wherein the receiving the selection and the receiving the maintenance item selection include changing both the groups and the items according to a scrolling of the management screens in a third direction intersecting with both the first direction and the second direction using the scroll icons.

8. The computer according to claim 7, wherein the receiving a transitioning selection includes displaying a pop-up menu for selecting the one group, wherein the transitioning selection is a user selection for transitioning from a prior-selected one of either the device upper groups or the device lower groups to a newly selected one of either the device upper groups or the device lower groups.

9. The computer according to claim 8, wherein the receiving the maintenance item selection includes displaying a pop-up submenu for selecting the one device-maintenance item.

10. The computer according to claim 8, wherein the pop-up menu is a hierarchized menu including a sub-menu.

11. The computer according to claim 8, further comprising:
displaying the breadcrumbs indicating a hierarchy of the plurality of groups; wherein
the receiving the transitioning selection includes displaying the first pop-up menu in response to a movement of a cursor over the breadcrumbs.

12. A non-transitory computer-readable recording medium storing a remote management program for controlling a computer including at least one processor and a memory and having an operation display unit, in a network-linked system for remote management of electromechanical device maintenance, the system including a device managing unit having a storage unit, a device database, and a plurality of electromechanical devices, the plurality of electromechanical devices being registered as maintenance-management device groups in the device management unit's storage unit, and the device groups being hierarchized as device upper groups and device lower groups, the device lower groups being the smallest units of maintenance management of the plurality of electromechanical devices, and a portion of the device lower groups being corresponding subunits of the device upper groups, and in the device management unit, device settings and management information being automatically collected from each of the electromechanical devices, and the device settings and management information being stored in the device database, the remote management program being a program of instructions, stored in the memory, that upon execution by the at least one processor cause the computer to perform operations for transitioning among hierarchized electromechanical-device groups in a user interface presented on the personal computer's operation display unit using a web browser for displaying a management screen, the operations comprising:
displaying, in the management screen, a header area displaying a group to be managed, a hierarchical position display area displaying breadcrumbs indicating a position in the hierarchy of the group to be managed, a maintenance item display area displaying maintenance items, and a maintenance information display area for displaying setting contents and management conditions;
wherein the maintenance items include devices, tasks, notifications, and reports, and wherein the settings and management information include settings and management of each device, settings and management of each task, setting and management of each notification, setting and management of each report;
receiving, in the hierarchical position display area of the user interface, a selection of a particular group and receiving, in the maintenance item display area of the user interface, a selection of a particular maintenance item;
in response to the selections of the particular group and particular maintenance item, displaying, in the maintenance information display area of the user interface, maintenance information for setting management of the selected maintenance item of the selected group;
receiving, in the maintenance item display area of the user interface, a selection of a new maintenance item; and
in response to the selection of the newly selected maintenance item, displaying, in the maintenance information display area of the user interface, maintenance information for setting and management of the newly selected maintenance item of the selected group;
wherein the receiving the selection includes changing the plurality of groups according to a scrolling of the management screens in a first direction using one of scroll icons displayed on the management screen, wherein the receiving the maintenance item selection includes changing the items according to a scrolling of the management screens in a second direction intersecting with the first direction using one of scroll icons, wherein the receiving the selection and the receiving the maintenance item selection include changing both the groups and the items according to a scrolling of the management screens in a third direction intersecting with both the first direction and the second direction using the scroll icons.

13. The non-transitory computer-readable recording medium according to claim 12, wherein the receiving a transitioning selection includes displaying a pop-up menu for selecting the one group, wherein the transitioning selection is a user selection for transitioning from a prior-selected one of either the device upper groups or the device lower groups to a newly selected one of either the device upper groups or the device lower groups.

14. The non-transitory computer-readable recording medium according to claim 13, wherein the maintenance item selection includes displaying a pop-up submenu for selecting the one maintenance item.

15. The non-transitory computer-readable recording medium according to claim 13, wherein the pop-up menu is a hierarchized menu including a sub-menu.

* * * * *